United States Patent [19]
Caton

[11] 3,842,321
[45] Oct. 15, 1974

[54] ELECTRICAL SWITCHGEAR WITH PRIMARY AND SECONDARY SWITCH MEANS ASSOCIATED WITH CURRENT TRANSFORMER

[75] Inventor: George Caton, Illkley, England

[73] Assignee: Yorkshire Switchgear and Engineering Co. Limited, Yorkshire, England

[22] Filed: Mar. 12, 1973

[21] Appl. No.: 340,263

[30] Foreign Application Priority Data
Mar. 16, 1972 Great Britain.................... 12482/72

[52] U.S. Cl........ 317/103, 200/50 AA, 200/153 SC
[51] Int. Cl. .......................................... H02b 11/06
[58] Field of Search ......... 200/50 A, 50 AA, 144 B, 200/153 SC; 317/103

[56] References Cited
UNITED STATES PATENTS

| | | | |
|---|---|---|---|
| 3,309,473 | 3/1967 | Wilson ........................... | 200/50 AA |
| 3,440,371 | 4/1969 | Netzel et al.................... | 200/50 AA |
| 3,609,261 | 9/1971 | Rys................................. | 200/50 A |
| 3,676,749 | 7/1972 | Wilson et al............... | 200/50 AA X |

*Primary Examiner*—James R. Scott
*Attorney, Agent, or Firm*—Stevens, Davis, Miller & Mosher

[57] ABSTRACT

Electrical switchgear comprising a stationary housing containing current inlet and outlet conductors forming elements of a primary high voltage circuit, a movable housing containing switching means for the primary circuit, mating primary supply contacts on said stationary and movable housings engageable when said movable housing in its operative position to connect said inlet and outlet conductors to said switching means, transformer means in said stationary housing, and a number of secondary circuits fed by said transformer means, wherein at least some of said secondary circuits are contained in said stationary housing and interacting means are provided between said housings for controlling those of said secondary circuits contained in said stationary housing in accordance with the state of said primary circuit switching means in said movable housing.

17 Claims, 4 Drawing Figures

ELECTRICAL SWITCHGEAR WITH PRIMARY AND SECONDARY SWITCH MEANS ASSOCIATED WITH CURRENT TRANSFORMER

This invention relates to electrical switchgear, and particularly to switchgear for controlling high voltage electrical supplies.

In conventional high voltage switchgear the actual primary supply switching means and operating mechanism, usually in conjunction with a circuit breaker, are mounted partly internal and partly external to the oil or gas enclosure of a movable housing, and the current inlet and outlet conductors are mounted in a stationary housing, which may also contain other electrical equipment, for example busbars, cable box and instrument transformers. The two housings may have isolating means such as mating plug and socket contacts for transmitting the primary supply of high voltage electricity through the switching means, the contacts being made or broken according to the relative positions of the two housings. With the contacts made, switching is effected by operation of the switching means on the movable housing. Apart from the primary high voltage supply such switchgear includes a number of secondary circuits, generally low voltage control and indicator circuits, which may be fed from current and voltage transformers in the stationary housing and controlled by switches operated in accordance with the state of the primary supply switching means. When a circuit breaker is incorporated this is usually tripped by energisation of a coil from an instrument transformer or from a relay, the relay being operated by a further secondary circuit.

In conventional systems the power supplies for the secondary circuits are taken from means in the stationary housing, but the elements of the secondary circuits responsive to such power, e.g. trip coils, auxiliary switches and electrical interlocks, are located in the movable housing. Accordingly, each movable housing has had to be custom built to incorporate the secondary equipment required for any particular installation (which requirements are subject to considerable variation), which can be an expensive and time-consuming process of switchgear manufacture. Furthermore, connection of the movable and stationary housings are not only involves connection of the primary circuit plugs and sockets, but also connection of plugs and sockets or trailing connections for the secondary circuits.

According to the present invention at least some of the secondary circuit elements are contained in the stationary housing rather than the movable housing. The primary circuit interruption means and associated switching mechanism are mounted in the movable housing, and the stationary and movable housings have respectively first and second sets of primary supply contacts capable of connection and disconnection by movement of the movable housing into and out of an operative position relative to the stationary housing. As at least some secondary circuit switches need to be controlled by the primary switching mechanism, and as the switching mechanism needs to be controlled by the circuit breaker coil (if provided) in the secondary circuits, then any such secondary circuit elements mounted in the stationary housing need to be in operating inter-relationship with mechanical elements in the movable housing, and the invention includes the provision of means for effecting such inter-relationship.

Such means may be wholly mechanical, the fixed and stationary housings having mechanical elements which are operatively juxtaposed when the movable housing is in its operative position, and the mechanical elements being connected respectively to the primary switching mechanism in the movable housing and to mechanically movable members of appropriate secondary circuit elements in the stationary housing. Alternatively such means may be electrical or electro-mechanical, electrical means controlling or controlled by the primary switching mechanism being mounted in the movable housing, and electrical means controlling or controlled by secondary circuit elements being mounted in the stationary housing, the two electrical means being capable of interconnection when the movable housing is in its operative position. Obviously a combination of mechanical and electrical interconnection may also be used.

The invention also includes the stationary and movable housings and their associated elements in their individual forms.

In the most advantageous form of the invention the secondary circuit elements are wholly confined to the stationary housing, and the movable housing is completely free of these. Thus, all the secondary equipment which varies according to the users differing needs for individual installations is concentrated in the control or instrument panel section of the stationary housing. By concentrating the variants in this manner the major proportion of the switchgear unit may be manufactured in standard form. The minor proportion containing the variable features may be manufactured separately and independently, as there are no secondary electrical interconnections between the major and minor sections. The coupling together of these sections at the chosen site is then purely a mechanical operation and there is no need to hold up factory assembly by tedious installation of secondary circuit elements which may vary from one movable housing to the next.

When the switchgear does not incorporate a form of circuit breaker then there is no automatic control of the switching mechanism in the movable housing that is required to be effected by the secondary control circuits. However, when automatic circuit breaking is incorporated then the switching mechanism must be tripped to open in response to a secondary circuit control signal.

In order to achieve this, the switching mechanism in the movable housing preferably includes a trip element projecting from the housing and movable to trip the switching mechanism mechanically, and the stationary housing includes an operating member responsive to an overload or other signal on a secondary circuit, the operating member being engageable with the trip element when the movable and stationary housings are in position with the first and second sets of primary supply contacts connected.

Thus, no circuit breaker secondary electrical connections to the movable housing are necessary and tripping is effected by mechanical operation of the trip element in response to movement of the juxtaposed operating member.

The movable and stationary housings may also be provided with further mechanical elements which may be juxtaposed when the two housings are in their operative positions, to give a mechanical indication of whether the switching mechanism is in the open or the closed position to indicator or auxiliary switches or other means in the stationary housing to control secondary circuits accordingly.

In these preferred arrangements the only interconnection between the housings, apart from the engagement of the primary supply contacts, is purely mechanical. It will be evident, however, that advantage can be gained over conventional equipment merely by locating some, but not all, of the secondary circuit elements in the stationary housing, so cutting down the need for special work on the movable housing and reducing the number of electrical interconnections between the two housings. Thus, the housings may be interconnected partly mechanically and partly electrically.

Even if all the normal secondary circuit elements are in the stationary housing then the interconnection between the housings may be electrical rather than mechanical. Thus, assuming that a number of secondary circuit switches have to be operated in response to the position of the primary switching mechanism then the position of this mechanism may be used to provide an electrical signal which will control the secondary circuit switches. Similarly, if the primary switching mechanism is to be operated to open the primary switch contacts in response to an overload in a circuit breaker secondary circuit, that secondary circuit may produce a control signal in response to the overload which can be used to operate a trip solenoid in the movable housing to cause the switching mechanism to open the primary switch contacts.

The elements of such electrical control systems that are needed in the movable housing can be built in as standard equipment, so gaining this advantage of the invention, but some electrical interconnection of the housings is necessary, although this is obviously much less than in conventional practice. However, a purely mechanical interaction between the two housings is preferred.

Preferably the two sets of primary contacts have their axes horizontally disposed so that connection and disconnection is effected by a horizontal movement of the movable housing. The movable housing may conveniently be fitted with wheels running on fixed rails to ensure correct alignment of the two housings, and thus proper connection between the two sets of primary contacts.

It is obviously advantageous if only horizontal movement of the movable housing is needed, as this obviates the need for lifting means, in contrast to many prior arrangements which employed vertical or other movements. However, vertical or inclined movement of the movable housing is possible.

The switching means in the movable housing comprises a set of fixed contacts, electrically connected to the second set of primary supply contacts, a set of movable contacts, and a mechanism for moving the movable contacts between open and closed positions. According to a further feature of the invention the movable contacts and mechanism for moving these are carred by a frame which is removably mounted in the movable housing. This enables the frame to be removed bodily from the housing for maintenance purposes, conveniently from the top of the housing which is usually covered by a lid which may be hinged to the housing or completely removable therefrom. A specific embodiment of switchgear according to the invention is shown by way of example in the accompanying drawings in which:

Figure 1:
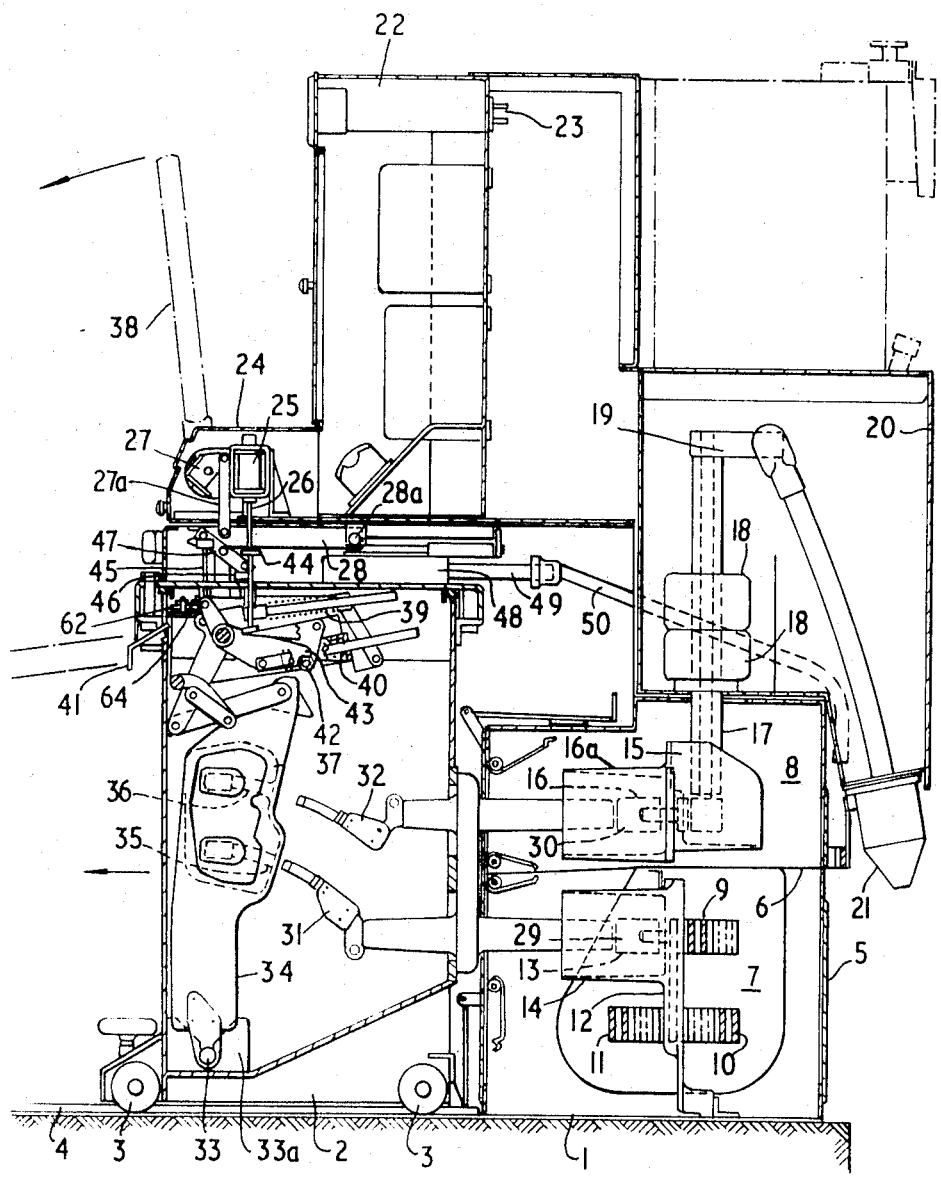
FIG. 1 is a part side elevation, part section through electrical switchgear according to the invention.
Figure 1A:
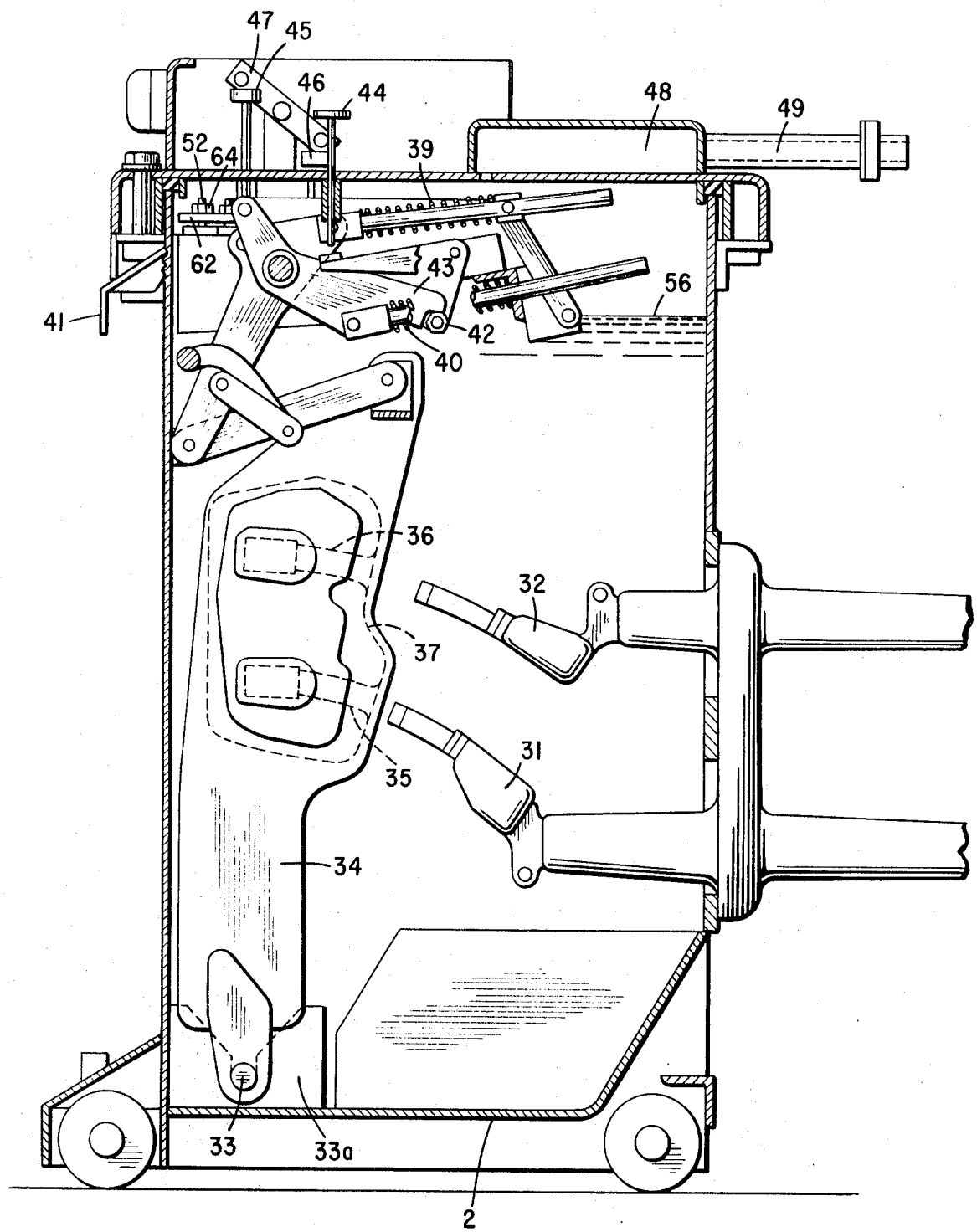
FIG. 1A is a side elevation showing the switch gear control mechanism of FIG. 1 in greater detail.
Figure 2:
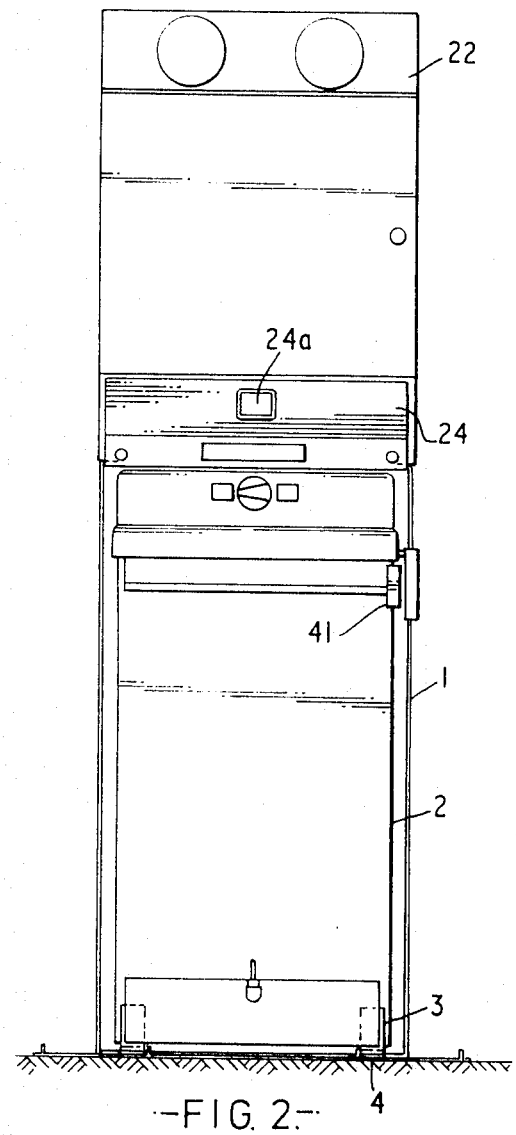
FIG. 2 is a front elevation of the switchgear.
Figure 3:
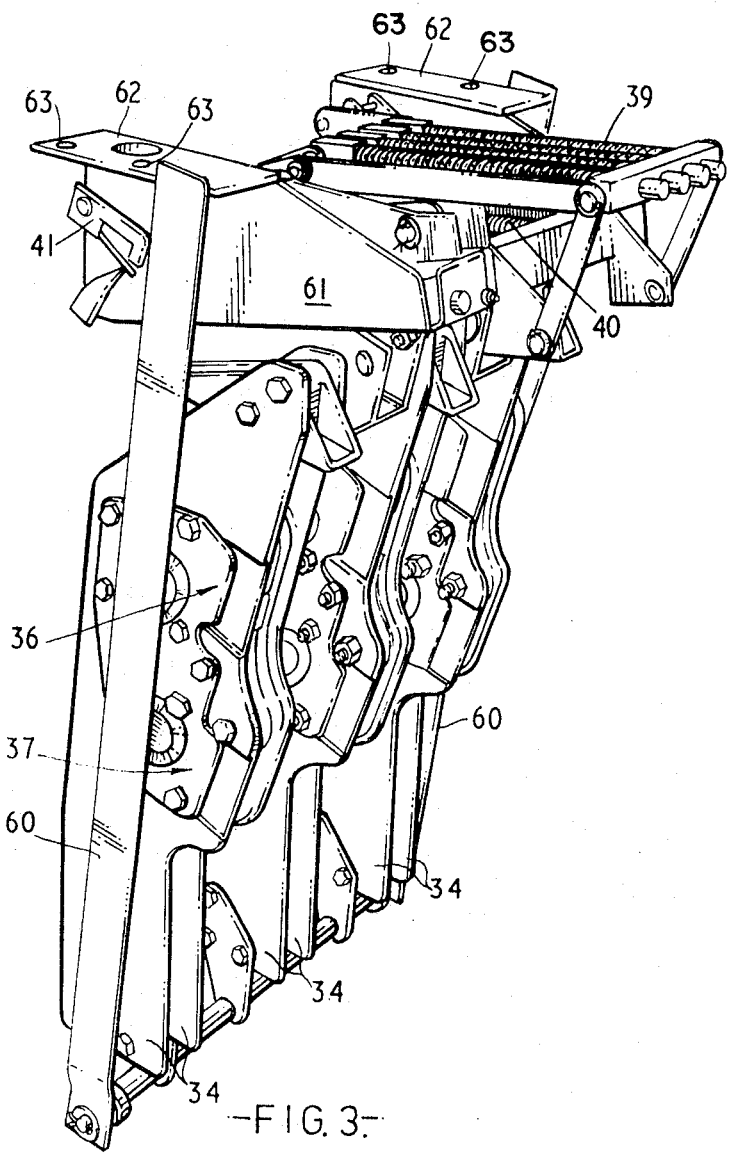
FIG. 3 is a perspective view of part of the switchgear removed from the movable housing.

This switchgear comprises a stationary housing 1 and a movable housing 2 having wheels 3 and capable of being moved on rails 4 horizontally towards and away from the stationary housing in the direction shown by the arrow. The stationary housing comprises four sections. The first section 5 is divided by a partition 6 into a lower busbar chamber 7 and an upper feeder current chamber 8. Assuming that a three-phase supply is to be controlled the busbar chamber 7 contains three busbars 9, 10 and 11, one for each phase, mounted on an insulating member 12. Each busbar is electrically connected to a receptacle socket, such as socket 13 for busbar 9, each receptacle socket having an insulating shield such as 14, and all three sockets being arranged in horizontal alignment.

In the upper chamber 8 a further insulating member 15 carries three horizontally aligned receptacle sockets, one for each phase. Each socket such as 16 has an insulating shield 16a and is connected to a conductor 17 which is the primary conductor for current transformer 18, the other end of this conductor being connected to a terminal 19 in the second section 20 of the stationary housing, which forms a cable box. The three terminals in the cable box 20 are electrically connected to cable connectors such as 21.

The third section 22 of the stationary housing lies above and projects forwardly from the first section 5 and houses an instrument panel and secondary circuits connected to the current transformers 18 and to a voltage transformer when required. The rear of section 22 is provided with terminals such as 23 for pilot cables capable of receiving or transmitting secondary information to a remote station. Secured in front of the third section 22 is the fourth section 24 which houses mechanical means responsive to or controlling secondary circuit elements and capable of cooperating with mechanical means carried by the movable housing. Thus, housed within the section 24 is a tripping device 25 comprising a tripping solenoid capable, when energised, of driving a plunger 26 downwardly. Also housed in section 24 are auxiliary switches 27 driven by a link 27a pivoted to a lever 28 which in turn is pivoted at 28a on the underside of the lower wall of section 24. An indicator 24a driven from the link 27a is also incorporated in section 24.

The movable housing 2 has on its rear surface a set of six insulated plugs, comprising two sets of three horizontally aligned plugs each having a cluster contact on the end and one set being positioned above the other. The plugs are so aligned that when the movable housing is moved on the rails 4 into the position shown on the drawing the cluster contacts will mate with the receptacle sockets in the busbar and feeder current chambers 7 and 8. Thus, cluster contact 29 mates with socket 13 and cluster contact 30 mates with socket 16.

Connected to the three cluster contacts such as 29 and located within the movable housing are three fixed contacts such as 31, and a similar set of three fixed contacts such as 32 are connected to the plugs 30. Pivotally mounted within the housing for movement about an axis 33 is a structure comprising three pairs of parallel insulating arms 34, each pair carrying movable contacts such as 35 and 36 for engaging the three sets of fixed contacts, such as 31 and 32 respectively. Each of the movable contacts 35 and 36 has an associated arc trap circuit interruption device such as 37. Movement of the movable contacts from the open position, shown in the figure, to the closed position is effected by a system of levers, shown schematically only, by releasing the stored force in a number of parallel closing springs 39. These springs are capable of being charged into a compressed condition by means of a handle 38 disengageably connected to the springs by a further lever system and manually operable to compress the springs. Release of the springs 39 to close the movable contacts is under the control of a manually operable release catch 41. Movement of the handle 38 to charge the closing springs 39 also has the effect of charging springs 40 which are effective when released to move the movable contacts from their closed position to their open position. The opening springs 40 are normally held in their charged position by engagement of a catch 42 with a lever 43, and disengagement of the catch 42 from the lever 43 allows the springs 40 to be released so pivoting the movable contacts to the open position. The catch 42 may be moved to release the springs by depressing a trip element 44 projecting through the upper wall of the movable housing and lying immediately beneath the plunger 26 when the movable and stationary housings are in their connected positions. The lever system controlling the position of the movable contacts also drives two tappets 45 and 46 projecting through the upper wall of the movable housing 2 and engaging opposite ends of a rocker arm 47 which engages with the pivoted lever 28 carried on the lower wall of section 24. With the movable contact in the open position as shown tappet 45 is raised and tappet 46 is lowered, but when the movable contact is moved into the closed position tappet 45 is lowered and tappet 46 is raised. The rocker arm 47 thus moves lever 28 about its pivot and the connecting link 27a effects appropriate switching in the secondary circuits, and drives the visual indicator 24a between ON and OFF positions.

The movable insulating contact arms 34 and the lever system for controlling operation of these arms are all mounted on a frame which is removably mounted in the movable housing 2. The frame includes side members 60 joined at their lower ends by a pivotal shaft 33 pivotally mounted in sockets 33a, and a transverse member 61. This includes plates 62 which are secured at the top of the movable housing by four studs such as 52 positioned near the front corners of the housing and passing through holes 63 in plates 62, each stud having an associated nut 64. The spring charging handle 38 and release catch 41 are both arranged to operate appropriate elements of the movable contact lever system through pusher elements so that there is no fixed connection between the lever mechanism and the manually operating members positioned externally of the movable housing. Thus, by merely removing the four bolts securing the frame at the top of the movable housing it is possible to lift the frame out of the housing for maintenance of the movable contact and lever system.

In order to facilitate such removal the movable housing is fitted with a removable lid.

As is conventional the switchgear in the movable housing is immersed in an oil bath which also partially covers the lever system. Whenever the switch is opened during short circuit conditions arcing at the contacts creates gas which must be released from the movable housing. To enable this release, the removable lid is formed with an opening leading into an expansion chamber 48 leading into two vents 49. These vents are in alignment with two vent tubes 50 extending through the stationary housing 1 and opening to atmosphere at the rear of the stationary housing.

It will be appreciated that the movable contact and lever system described briefly above is not essential to the invention and can be replaced by any other form of movable contact arrangement and control system therefor. In accordance with the invention the control system preferably comprises tappets such as 45 and 46 or equivalent mechanical indicating elements responsive to the position of the movable contacts. Furthermore if automatic circuit breaking is incorporated the control system for the movable contacts must be capable of being operated by a trip device such as 25 or some equivalent operating member.

It will be understood from the foregoing description that the movable housing only houses the movable contacts and control arrangement for these contacts, together with the fixed contacts. No secondary electric circuit elements are built into the movable housing which in consequence can be factory made as a standard product. All necessary secondary circuit elements are built into the stationary housing and any interdependent operation of the secondary circuit and the control mechanism for the movable contact is effected by juxtaposition of mechanically operable elements when the movable and stationary housings are in their operative positions.

It will also be understood that as the whole of the operating mechanism is contained within the oil enclosure it is protected against corrosion and is splash lubricated from the oil bath.

What I claim is:

1. Electrical switchgear, comprising:
   a. a stationary housing containing current inlet and outlet conductors forming elements of a primary high voltage circuit, transformer means, at least one secondary circuit fed by the transformer means and secondary switch means for controlling said secondary circuit;
   b. a movable housing containing primary switching means for said primary circuit, said primary switching means including contacts movable between open and closed positions;
   c. mating primary supply contacts on said stationary housing and said movable housing, said primary supply contacts mating with each other when said movable housing is in an operative position relative to said stationary housing to connect said inlet and outlet conductors to said primary switching means;
   d. movable mechanical transmission elements projecting from said movable housing;
   e. means coupling said transmission elements to said movable contacts for controlling the position of said transmission elements in accordance with the open and closed positions of said movable contacts of said primary switching means;

f. movable mechanical sensing elements projecting from said stationary housing and linked to operate said secondary switch means;

g. said sensing elements being juxtaposed with and engageable by said transmission elements when said movable housing is in said operative position whereby said secondary switch means is controlled in accordance with the open and closed positions of said movable contacts of said primary switching means through said transmission elements and sensing elements.

2. Electrical switchgear according to claim 1 in which the axes of said primary supply contacts are horizontally disposed and said movable housing is movable horizontally into and out of said operative position.

3. Electrical switchgear according to claim 2 and including fixed rails extending from the stationary housing and wheels fitted to said movable housing and running on said rails.

4. Electrical switchgear according to claim 2 in which said stationary housing has a first section containing said inlet and outlet conductors and a second section projecting horizontally from said first section at such a height as to accommodate said movable housing beneath said second section when said movable housing is in said operative position, said mechanical transmission elements project upwardly from the upper surface of said movable housing and said mechanical sensing elements project downwardly from the lower surface of said second section of said stationary housing.

5. Electrical switchgear according to claim 1 in which said primary switching means includes a trip member projecting from said movable housing and a spring-operated circuit breaker coupled with said trip member to break said primary circuit on movement of said trip member, and said stationary housing includes a mechanical operating member juxtaposed with and engageable with said trip member when said movable housing is in said operative position, said mechanical operating member being movable in response to a signal on a secondary circuit in said stationary housing to move said trip member and so operate said circuit breaker.

6. Electrical switchgear according to claim 5 in which the axes of said primary supply contacts are horizontally disposed and said movable housing is movable horizontally into and out of said operative position, said stationary housing has a first section containing said inlet and outlet conductors and a second section projecting horizontally from said first section at such a height as to accommodate said movable housing beneath said second section when said movable housing is in said operative position, said trip member projects upwardly from the upper surface of said movable housing and said mechanical operating member projects downwardly from said lower surface of said second section of said stationary housing.

7. Electrical switchgear according to claim 1 in which said primary switching means comprises a mechanism for moving said movable contacts between said open and closed positions and a set of fixed contacts connected to respective ones of said primary supply contacts, said movable contacts and said moving mechanism; the apparatus further comprising a frame which is removably mounted in said movable housing and on which said movable contacts and mechanism for moving these are mounted.

8. A stationary housing assembly for use in electrical switchgear, comprising a stationary housing containing current inlet and outlet conductors forming elements of a primary high voltage circuit, transformer means, at least one secondary circuit fed by the transformer means and secondary switch means for controlling said secondary circuit, primary supply contacts on said stationary housing for mating with corresponding contacts on a movable housing when said movable housing is in an operative position relative to said stationary housing, and movable mechanical sensing elements projecting from said stationary housing and linked to operate said secondary switch means, said sensing elements being arranged for juxtaposition with and engagement by movable mechanical transmission elements projecting from said movable housing when said movable housing is in said operative position.

9. A stationary housing assembly according to claim 8 in which the housing comprises a first section containing the inlet and outlet conductors and a second section projecting horizontally from said first section at such a height as to accommodate said movable housing beneath said second section when said movable housing is in said operative position, and said mechanical sensing elements project downwardly from the lower surface of said second section.

10. A stationary housing assembly according to claim 8, further comprising a mechanical operating member projecting from said stationary housing and tripping means responsive to conditions requiring circuit breaking coupled to said operating member for moving said operating member in response to said circuit breaking conditions.

11. A stationary housing assembly according to claim 10 in which the housing comprises a first section containing the inlet and outlet conductors and a second section projecting horizontally from said first section at such a height as to accommodate said movable housing beneath said second section when said movable housing is in said operative position, and said mechanical sensing elements project downwardly from the lower surface of said second section, said tripping means is mounted in said second section and said mechanical operating member projects downwardly from the lower surface of said second section.

12. A movable housing assembly for use in electrical switchgear, comprising a movable housing containing primary switching means for a primary high voltage electrical circuit, said primary switching means including contacts movable between open and closed positions, primary supply contacts for mating with corresponding contacts on a stationary housing when the movable housing is in an operative position adjacent to said stationary housing, movable mechanical transmission elements projecting from said movable housing, and means controlling the position of said transmission elements in accordance with the open and closed positions of said movable contacts of said primary switching means, said mechanical transmission elements being arranged for juxtaposition with and engagement with mechanical sensing elements projecting from said stationary housing when said movable housing is in said operative position.

13. A movable housing assembly according to claim 12 in which said primary supply contacts have horizontally disposed axes and said movable housing is fitted with wheels supporting it for horizontal movement.

14. A movable housing assembly according to claim 13 in which said mechanical transmission elements project from the top of said movable housing.

15. A movable housing assembly according to claim 12 in which the switching means includes a trip member projecting from said movable housing and a spring-operated circuit breaker coupled with said trip member to break said primary circuit on movement of said trip member.

16. A movable housing assembly according to claim 15 in which said trip member projects from the top of said movable housing.

17. A movable housing assembly according to claim 12 in which said switching means in the movable housing comprises a mechanism for moving said movable contacts between said open and closed positions and a set of fixed contacts connected to respective ones of said primary supply contacts, said movable contacts and said moving mechanism; the assembly further comprising a frame which is removably mounted in said movable housing and on which said movable contacts and mechanism for moving them are carried.

* * * * *